Aug. 8, 1967 H. BURKHARDT 3,335,076
PROCESS FOR PURIFYING AND TRANSPORTING LIGHT METAL
Filed June 9, 1964
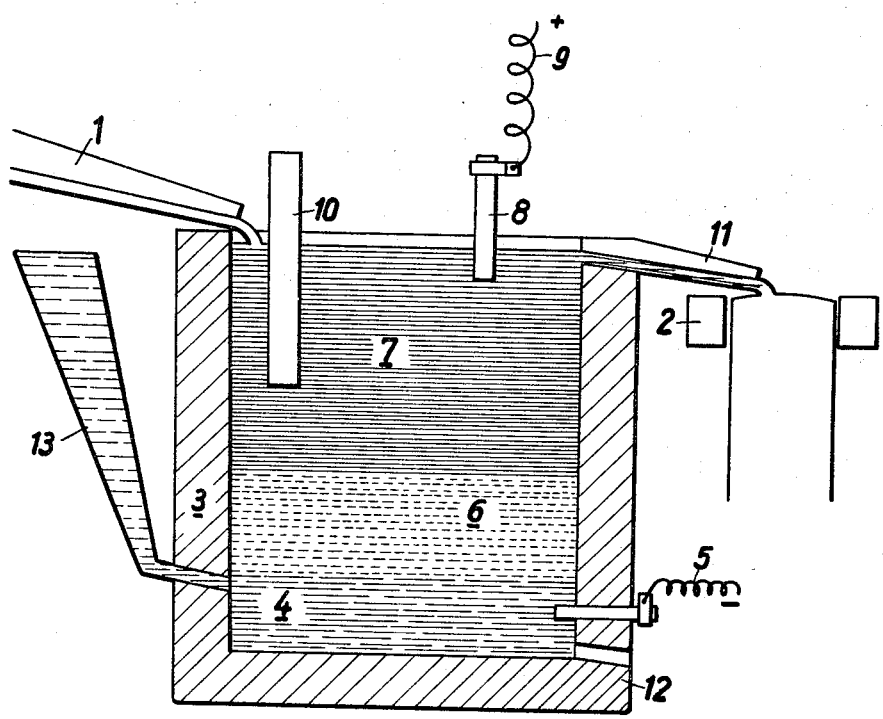
Inventor:
HANS BURKHARDT
By Burgess, Dinklage & Sprung
ATTORNEYS United States Patent Office 3,335,076
Patented Aug. 8, 1967

3,335,076
PROCESS FOR PURIFYING AND TRANSPORTING LIGHT METAL
Hans Burkhardt, Oberursel, Germany, assignor to Vereintgte Deutsche Metallwerke A.G., Zeilweg, Frankfurt am Main-Heddernheim, Germany, a corporation of Germany
Filed June 9, 1964, Ser. No. 380,739
Claims priority, application Germany, June 11, 1963, V 24,170; June 12, 1963, V 24,172
14 Claims. (Cl. 204—140)

This invention relates to the purifying and transporting of light metal, and more particularly relates to improvements in purifying and transporting molten light metal, such as aluminum, magnesium, calcium or the alkali metals.

The presence of oxides and nitrides, particularly in the form of skins and dissolved hydrogen, is a very frequent cause of faulty castings of light metal. The artisan in this field has consequently always attempted to purify the molten metal in the melting furnace itself or after these metals have been transferred to a holding furnace. The accumulation of the molten metal in the holding furnace is directed at the segregation of solid impurities and the removal of gases and is an operation which requires many hours, and, even after an entire day of standing, often results in castings not entirely perfect. The perfect castings sought to be produced are not even certain to be obtained by resorting to additional procedures of introducing gases, such as chlorine or such purifying agents as salts, into the melts, both of which procedures are effected only at great cost in time and materials.

In accordance with one proposal of the prior art, very good purification is achieved by establishing in the melting furnace beneath the molten light metal a layer of a specifically heavier salt melt composed of alkaline earth metal chlorides and by causing chlorine to be evolved in extremely fine distribution at the bottom surface of the molten light metal by passing direct current through the salt. The execution of this procedure, however, has proved economically impracticable due to the high installation costs involved in purchasing sufficiently large direct current sources and due to the costs involved in setting up and renewing the salt layer, the fusion of which also presents difficulties in view of the large amounts required to be present in the melting furnace. It has also developed that the purity of the metal achieved by this procedure in the melting furnace is considerably reduced over the long period of time required in pouring the contents of the large melting furnace and again during the transfer of the melt from the melting furnace to the mold.

One of the objects of the present invention is to provide a very efficient process and apparatus capable of treating molten light metals in a manner which will minimize to a great extent the impurities contained therein.

Another object of the invention is to provide a process and apparatus for the purifying and transporting of molten light metal whereby the purification achieved is not lost by the time-consuming and laborious operations involved in their further processing and transportation.

It is also another object of the present invention to provide a ruggedly constructed unitary assembly which can be handled as a single unit and which is capable of accomplishing all of the above objects.

Other objects and advantages of the invention will become apparent from the following disclosure:

In the drawing, there is shown a vertical sectional view of a preferred embodiment of an apparatus in accordance with the invention.

With the above in view, the present invention overcomes the present objections and drawbacks in handling molten light metal and provides a very efficient method and apparatus for purifying and transporting molten light metal.

In accordance with the invention, the light metal melt on its way to the mold is flowed over a salt melt composed of at least one alkaline earth metal halide having a higher specific gravity than that of the light metal. While the light metal melt is flowing over the molten salt, a stream of direct current is conducted through the salt melt by means of a solid or liquid electrode, maintained at the bottom of the salt melt and by means of a contact piece immersed into the light metal melt, the latter forming the anode. In this manner, chlorine is evolved at the bottom surface of the flowing light metal and combines with the light metal, for example aluminum to form aluminum chloride, which then rises through the molten light metal in the form of extremely fine gas bubbles, producing excellent purification.

It is advantageous to use current densities for the electrolytic production of chlorine of more than 5 amperes per square decimeter, and preferably to use current densities of 10 to 100 amperes per square decimeter, with reference to the horizontal bottom surface of the light metal melt. Such current densities are indicated as the time available for action upon the flowing light metal is very short. It has surprisingly been found that even at these high current densities, the chlorine and the bubbles of aluminum chloride formed still have a sufficiently fine distribution for complete utilization of the chlorine for purification to result. The more rapidly the light metal melt is flowed through the spout and the more impure it is and particularly the higher its content of dissolved hydrogen is, the higher should be the current densities selected.

For carrying out the process of the invention, the spout leading from the melting furnace to the mold is made broader and deeper by the interposition of a trough for electrolytic chlorination. The size of the trough is governed by the amount of light metal flowing through the same per unit of time, that is, by the rate at which the metal is poured into the mold.

The invention both as to its construction and its method of operation will be better understood from the following description of a specific embodiment thereof:

Referring now to the drawing, there is shown therein a spout 1, through which the liquid metal is carried from the furnace to the electrolysis trough 3. The counter-electrode 4 in this embodiment consists of liquid metal and is connected as a cathode having an electric current source 5. The molten salt layer 6 overlies the liquid metal cathode 5 and is, in turn, overlaid with the liquid light metal 7. In the liquid light metal layer 7, a carbon rod 8 is arranged and serves as a contact, being connected to a source of power 9. A guiding wall 10 for establishing the course of the light metal introduced into the trough is provided. There is also provided an outlet opening 11 beneath the surface of the light metal through which the purified metal passes from the spout into the mold 2. A discharge opening 12 capable of being closed and through which the metal of the counterelectrode can be discharged is provided in the spout as is an inlet 13 through which electrode metal can be freshly supplied.

For melting the salt and the metal forming the liquid counterelectrode, the electrolysis trough 3 is provided with a conventional heating system which is not shown in the drawing. The heating can be carried out by any known method, as, for example, directly using gas burners, by resistance heating or by inductive heating. During operation, heating is usually unnecessary since additional heat is supplied by the electrolysis current, the same being capable of compensating for any cooling losses. The molten salt layer consists preferably of barium chloride to which other salts can be added to reduce the melting point of the salt layer as, for instance, such salts as the chlorides or fluorides of the alkaline earth metals or alkali metals as exemplified by magnesium chloride, calcium chloride and potassium fluoride. However, when such additives are employed, care must always be taken to see that the specific gravity of the salt layer is greater than that of the molten light metal.

In carrying out the purification treatment of aluminum melts, it is preferable to use mixtures of barium chloride and calcium chloride in weight ratios ranging from 1.1:1 to 6:1. For the specifically lighter metal magnesium, smaller percentages of barium chloride suffice.

It has been found advantageous to use iron as the material for the solid counterelectrode and for the current source located at the bottom of the salt bath. Other metals or electrically conductive carbon, can also be used for this purpose. It has been found particularly advantageous to use carbon for supplying current to molten aluminum.

In the case of salt mixtures having high contents of calcium, there is the danger that portions of the solid calcium segregated at the counterelectrode will come loose from the latter and rise in the salt bath due to the low specific gravity of the calcium, and will alloy with the aluminum. The same thing can happen when the temperature in the salt bath reaches the melting point of calcium. To prevent solid or liquid portions of the metal segregated at the counterelectrode and having a lower specific gravity than the salt bath, such as calcium or magnesium, from getting into the aluminum in this manner, a counterelectrode which is constructed of metals or alloys which are liquid at the temperatures used, and which have a higher specific gravity than the salt baths and are capable of alloying with the metal segregated at the cathode, is used in a preferred embodiment of the process. Barium, lead and tin and their alloys are particularly suitable for this purpose.

The following example is given in order to more clearly disclose the nature of the present invention. It should be understood, however, that the example is not intended to be a limitation on the scope of the invention.

*Example*

A melt of pure aluminum was conducted from a melting furnace through the electrolysis trough of the invention to a continuous rolling-ingot casting mold. The trough, which had a clear depth of 70 cm. contained a bottom layer (20 cm. deep) of a molten mixture of barium chloride and calcium chloride in a weight ratio of 4:1. Above this layer the molten aluminum having a 40 cm. depth was formed. A direct current of 70 amperes per square decimeter of the bottom surface of the aluminum melt was passed through by means of a bar of carbon immersed into the molten aluminum and an iron spiral located in the molten salt.

The chlorine separated by the current united with the aluminum to form gaseous aluminum chloride, which rose through the molten metal in extremely fine bubbles, and passed from its surface into the air, while an equivalent amount of a liquid barium-calcium alloy collected on the floor of the trough and, after overflowing the iron spiral, acted as the counterelectrode.

To restore the salt consumed by the electrolysis, chlorine (after 10 hours of operation) was fed into the barium-calcium alloy for 10 minutes through a carbon tube. The chlorine reacted with the alloy to form barium chloride and calcium chloride.

By this treatment, aluminum oxide, sodium and hydrogen were considerably reduced in the molten aluminum and a rolling ingot was obtained having a clear and bright appearance.

The extraordinarily increased effectiveness of the electrochemical chlorination over that of the prior-art process of the chlorination of light-metal melts is based upon the exceptional fineness, uniform size and uniform distribution of the gas bubbles, which additionally, because of their small size, rose relatively slowly in the melt.

In the case of aluminum alloys containing magnesium, the aluminum chloride that first predominates due to the high aluminum content reacts wholly or partially with the magnesium alloy, depending on the amount of the latter, to form molten magnesium chloride and aluminum. The magnesium chloride formed in the aluminum melt is capable, due to its extremely fine division, of removing oxides and nitrides from the metal with special effectiveness.

In the case of pure magnesium and magnesium alloys not containing aluminum, no gaseous aluminum chloride is produced in the chlorination process of the invention. The extensive purification of the magnesium by the process of the invention is due solely to the very finely divided magnesium chloride that is electrolytically produced.

The process can be applied both to pure light metal and to alloys. It is especially appropriate for the treatment of melts freshly withdrawn from electrolysis cells, since it makes it possible in these cases to save the time that has been hitherto required for allowing the molten metal to stand for purification purposes.

Electrolytic chlorination has the further advantage over the very unpleasant introduction of gaseous chlorine that has been the usual method until now, that, due to the fine distribution achieved thereby that much less chlorine has to be produced for the purification, and there is no liberation of unreacted chlorine from the molten metal into the air.

I claim:

1. Process for purifying and transporting molten light metal which comprises continuously feeding impure molten light metal to a flowing layer of molten light metal over a layer of a molten metal salt composed at least in part of an alkaline earth metal halide characterized by a specific gravity higher than that of said molten light metal, electrolyzing said alkaline earth metal halide with said molten metal as anode whereby halogen gas is developed at the under surface of said flowing light metal, combining in part with said molten light metal to form the corresponding light metal halide gas, which metal halide gas together with uncombined halogen gas thereafter passes upwardly through said molten light metal in the form of small finely distributed bubbles and continuously withdrawing purified molten light metal from said flowing layer.

2. Process according to claim 1, wherein said molten metal salt consists of barium chloride.

3. Process according to claim 1, wherein said molten metal salt consists of barium chloride in admixture with at least one member selected from the group consisting of alkali metal halides and alkaline earth metal halides other than barium halide.

4. Process according to claim 1, wherein said molten metal salt consists of barium chloride and calcium chloride in a weight ratio of 1.1:1 to 6:1.

5. Process according to claim 3, wherein said current has a density of more than 5 amperes per square decimeter.

6. Process according to claim 3, wherein said current has a density of from 10 to 100 amperes per square decimeter.

7. Process for purifying and transporting molten light metal which comprises continuously feeding impure molten light metal to a flowing layer of molten light metal over a layer of a molten metal salt composed at least in part of an alkaline earth metal halide characterized by a specific gravity higher than that of said molten light metal, conducting a stream of direct electric current through said molten alkaline earth metal halide with said molten metal as anode whereby halogen gas is developed at the under surface of said flowing light metal, combining in part with said molten light metal to form the corresponding light metal halide gas, which metal halide gas together with uncombined halogen gas thereafter passes upwardly through said molten light metal in the form of small finely distributed bubbles and continuously withdrawing purified molten light metal from said flowing layer.

8. Process for purifying and transporting molten light metal which comprises continuously feeding impure molten light metal to a flowing layer of molten light metal over a layer of a molten metal salt composed at least in part of an alkaline earth metal halide characterized by a specific gravity higher than that of said molten light metal, electrolyzing said alkaline earth metal halide by conducting a stream of current through said alkaline earth metal halide with said molten metal as anode employing as cathode a liquid metal electrode characterized by a specific gravity higher than that of said alkaline earth metal halide whereby halogen gas is developed at the under-surface of said flowing light metal, combining in part with said molten light metal to form the corresponding light metal halide gas, which metal halide gas together with uncombined halogen gas thereafter passes upwardly through said molten light metal in the form of small finely distributed bubbles and continuously withdrawing purified molten light metal from said flowing layer.

9. Process according to claim 8, wherein said liquid metal electrode is a member selected from the group consisting of barium, lead, tin, and alloys consisting essentially thereof.

10. Process according to claim 8, wherein said liquid metal electrode comprises a metal capable of alloying itself with the metal segregated cathodically from said alkaline earth metal halide.

11. Process according to claim 8, wherein said light metal is aluminum and said alkaline earth metal salt is a mixture of barium chloride and calcium chloride in a weight ratio of 4:1.

12. Process according to claim 8, wherein said light metal is a member selected from the group consisting of aluminum, magnesium, calcium, alkali metals, and alloys and mixtures consisting essentially thereof.

13. Process according to claim 8, wherein said light metal is aluminum.

14. Process according to claim 8, wherein said light metal is magnesium.

References Cited

UNITED STATES PATENTS

| | | | |
|---|---|---|---|
| 2,787,592 | 4/1957 | Burkhardt | 204—245 X |
| 2,919,234 | 12/1959 | Slatin | 204—67 |
| 3,226,311 | 12/1965 | Van Diest | 204—71 X |

JOHN H. MACK, *Primary Examiner.*

D. R. VALENTINE, *Assistant Examiner.*